Patented Nov. 1, 1949

2,486,925

UNITED STATES PATENT OFFICE 2,486,925

PRODUCTION OF PHENOLIC ETHERS OF POLYHYDRIC ALCOHOLS

Michael Francis Carroll, London, England

No Drawing. Application June 2, 1948,
Serial No. 30,725

17 Claims. (Cl. 260—613)

This invention relates to the manufacture of monophenolic glyceryl ethers (pure, commercially pure and technical) by the direct condensation of phenol, a phenol homologue or cresol, or any two or all three of these reagents, with glycerol, with the formation and elimination of water formed as a result of the condensation reaction.

By "cresol" is meant, in the sense in which the term is used herein and in the claims appended hereto, any of the three isomers—ortho, meta-, and para-cresol, also any mixture of any two or more of these isomers such, for example as the mixtures obtained from coal, including the material generally known in commerce as "cresylic acid." Also, for convenience, the term "phenolic reagent" will be used herein and in the said claims, with reference not only to phenol but also to phenol homologues and cresol (as above defined), it being understood that the term would also apply to mixtures of any two or more of these reagents. Correspondingly, the expression "phenolic glyceryl ether" will be used herein and in the claims appended hereto, with reference not only to ethers obtained from phenol but also to ethers obtained from a phenol homologue or cresol, it being understood again that the expression would apply also to mixtures of any two or more of these ethers. Further, wherever the abbreviations "mono-ether" and "di-ether" are used herein and in the claims appended hereto, the ethers referred to are respectively mono-phenolic glyceryl ether and di-phenolic glyceryl ether, in the sense in which the expression "phenolic glyceryl ether" has been defined above.

A process for the production of mono-phenyl glyceryl ethers by direct condensation has been proposed by Zickovic in "Monatshefte fur Chemie," vol. 29, 1908, at pages 952 et seq., wherein a large amount of glycerol in excess of an equimolecular proportion of the phenol reagent was employed, in the presence also of a large proportion of sodium acetate as a catalyst. Thus, according to the method proposed by Zickovic, one part of crystalline phenol, two parts of glycerol and one part of anhydrous sodium acetate are heated for from 12 to 20 hours in a glass flask while illuminating gas is passed through the flask. The reaction product, on cooling and solidifying, is extracted by benzene with applied heat and subjected to various subsequent treatments involving the addition of petroleum ether to form a precipitate, which is re-purified by further treatment prior to the ultimate isolation of the ethers. The crystals thus obtained are stated to be easily soluble in water, ether, alcohol and benzene. Zickovic specifies a precisely similar procedure for the production of other mono-phenolic glyceryl ethers, including mono-cresyl glyceryl ether.

As the result of my experiments, I have found, quite unexpectedly, that if, instead of using an amount of the glycerol in excess of an equimolecular proportion of the phenolic reagent, as in the Zickovic procedure, an excess of the phenolic reagent over an equal molecular proportion of the glycerol is employed as hereinafter specified, thus providing in the condensation step a reactive environment for the glycerol enriched with the phenolic reagent, greatly improved results are obtainable.

Thus, I have found, as the process is practiced according to the examples hereinafter described, that the presence during at least the greater part of the condensation reaction, including the early part thereof, of an excess as referred to of the phenolic reagent, which excess is preferably of a substantial magnitude as hereinafter more particularly indicated, enables the condensation to be concluded with a percentage conversion of 60% and over of the glycerol into a mixture of mono- and di-phenolic glyceryl ethers, with the mono-ether component of the mixture predominating, in parts by weight, over the di-ether component. Indeed, it is possible, under suitably controlled conditions, to obtain, with a percentage conversion as referred to of the glycerol, a mixture of ethers in which the mono-ether comprises nearly the whole of the mixture, for example a proportion thereof in the neighbourhood of 90% in parts by weight. Such a mixture could be referred to in commerce as "commercially pure" mono-ether as distinguished from so-called "technical" mono-ethers, which usually contain a smaller percentage of mono-ether (i. e. than 90%) and a correspondingly larger percentage (than 10%) of di-ether, but which, nevertheless, are within the scope of this invention to manufacture, as also pure (i. e. isolated) mono-ethers—as already indicated. I have further found that losses in the reaction due to poly-glycerol formation and consequential by-product formation, through subsidiary condensation reactions, are or can be surprisingly small. I have also found that the resulting mixture of reaction products thus obtained at the conclusion of the condensation step lends itself readily and conveniently to the isolation of the phenolic glyceryl ethers contained in it and also to the recovery of its content of unconsumed reagents (phenolic reagent and glycerol) and water-soluble catalyst (e. g. sodium acetate) for return to and re-use in the process in a subsequent batch-making operation, such isolation and recovery being preferably performed with the use of a specific mode of procedure hereinafter described and itself forming a subsidiary feature of the invention. In consequence it is possible to obtain by the new process high average yields of mono-phenolic glyceryl ether products based on the quantity of reagents used, as will later be shown.

Broadly stated, the invention consists in this, that in a process for the production of monophenolic glyceryl ethers by condensation of glycerol with a phenolic reagent, the relative proportions used of the glycerol and the phenolic reagent for the ensuing condensation reaction are such that the phenolic reagent is present in excess of an equimolecular proportion of the glycerol, the said condensation reaction being concluded while the resulting product of mixed phenolic glyceryl ethers contains the mono-ether in predominating proportion, in parts by weight, over the di-ether.

As generally applied, the phenolic reagent and the glycerol are in proportions in the reaction vessel such that initially and throughout at least the greater part of the condensation reaction, the unconsumed phenolic reagent is present in the liquid mixture in higher proportion than is the unconsumed glycerol.

The invention is not restricted to any specific method of promoting the condensation reaction, being based upon the discovery that, under otherwise comparative conditions, provided the phenolic reagent is present in an excess as referred to and particularly if the conditions in this respect are as set forth in the preceding paragraph, a marked improvement in the resulting percentage conversion of glycerol into a mixture of mono- and di-ethers is obtainable in the reaction; a higher ratio of mono-ether to di-ether in said mixture is also obtainable, and, under suitably controlled conditions, as hereinafter more particularly described, a commercially pure mono-phenolic glyceryl ether is readily obtainable and isolatable.

Condensation reactions involving the elimination of water are known, wherein the reaction is promoted by the employment of a condensation catalyst adapted to facilitate the condensations. Sodium acetate, a known condensation catalyst, has been found peculiarly adapted for carrying out the reaction between the reagents of the present process, because it fulfills the essential conditions of being soluble in glycerol under anhydrous conditions and of being stable under the temperature conditions of the condensation reaction; it is also freely soluble in water, which is of value for a convenient post-condensation recovery procedure, and it is cheap and readily available in commerce for the purposes of a manufacturing process. The invention is, however, not limited to the employment of any particular condensation catalyst, as it will be obvious that other catalysts capable of promoting condensation reactions involving the elimination of water, more particularly potassium acetate and other water soluble alkali metal salts of the lower (non-soap) saturated aliphatic acids, may be used in the process of the invention, provided they fulfil the above conditions, in at least substantial measure. Optimum results have generally been obtained with sodium acetate.

In the case of use of a phenol homologue as the phenolic reagent in the process, the homologue should, for a satisfactory yield, conform to the following requirements:

(1) It should be soluble, at least to a substantial extent, in a mixture of glycerol with the catalyst (e. g. sodium acetate) used in the reaction, at the temperature of the reaction. If it is not so soluble, a two-phase system will result, one layer consisting substantially of the phenol homologue and the other of the glycerol-catalyst mixture, and the undesirable formation of polyglycerols will be favoured, since owing to heterogenity of the mixture the conditions necessary for favouring mono-ether formation (namely an excess of the phenolic reagent) will be largely absent.

(2) It should not be substituted in the ortho position by heavy alkyl groups, as such substitution reduces the reaction rate, owing to steric hindrance with the result that polyglycerol formation is again favoured at the expense of monophenyl glyceryl ethers.

As illustrative of the foregoing it may be remarked that para-tertiary amyl phenol reacts satisfactorily, para-octyl phenol somewhat less so and para-cetyl cresol is almost unreactive.

Obviously, mixtures of homologues which conform to requirement 1 can be used even though some of the constituents may be insoluble in the pure state.

As already indicated, the phenolic reagent used in the process may be a mixture of phenol, or cresol, with a phenol homologue. For example, it may be a technical mixture of (a) cresols and (b) xylenols, in approximately equal proportions.

It is generally found that when using a phenolic reagent consisting wholly or in substantial part of a phenol homologue, it is necessary or advantageous, in order to ensure an adequate yield of mono-ethers, to employ an entraining agent additional to any portion of the excess of phenolic reagent that may act as an entraining agent, the function of such entraining agent being, as will be understood, to remove water of reaction from the reaction sphere, thereby promoting the desired reaction, and/or, in the event of the phenolic reagent being one which has such a high boiling point that it is otherwise difficult or impossible to maintain the preferred temperature for the reaction of substantially 200°–250° C., to conduct the reaction under conditions of reduced pressure.

The additional entraining agent should preferably be substantially immiscible with water and capable of forming an azeotrope therewith, its function being as stated to remove water of reaction from the reaction sphere. It should further be non-reactive towards the phenolic and glycerol reagents and also towards the catalyst used, and it should have a lower boiling point than the phenolic reagent. Suitable materials for the purpose include xylene, toluene, benzene and petroleum fractions having a boiling range of from 60°–140° C.

A further advantageous effect inherent in the use of an excess as referred to of the phenolic reagent in accordance with the principal feature of the present invention as set forth above, is that such use enables the resulting liquid mixture of reaction products to be easily resolved into two readily separable, immiscible, or substantially immiscible, layers composed respectively of solutions of (a) the mono- and di-phenolic glyceryl ethers and unconsumed phenolic reagent and (b) unconsumed glycerol, the catalyst used in the reaction and any polyglycerols that may have been formed in the condensation step and are present therefore in the liquid mixture of reaction products, the layer composed of solution a being afterwards separated from the layer composed of solution b and then subjected to distillation for the isolation of the ethers contained in it. Such resolution of the liquid mixture of reaction products into readily separable layers as referred to is efficiently accomplished, according to a preferred form of the invention, by adding a hydrocarbon solvent, such as xylene, and water to the mixture with agitation thereof, and then allowing the mixture to settle and stratify. After separation of the layer composed of solution a the layer composed of solution b may be concentrated to a syrupy liquor and in this form returned to the process for re-use therein, if desired along with unconsumed phenolic reagent from the layer composed of solution a. The hydrocarbon solvent used in the foregoing preferred procedure should be one facilitating the isolation of the phenolic glyceryl ethers by subsequent fractional distillation, for which reason the selected hydrocarbon solvent should have a boiling point within the range of 80–150° C., as benzene, xylene and toluene.

The magnitude of the excess of the phenolic reagent in the process may vary widely. It is found, however, that more especially in the case of a process including the aforesaid specific mode of ether isolation and unconsumed reagents and catalyst recovery, an excess of the order of 40–100%, i. e., relative molecular proportions of 1.4:1 to 2:1, phenolic reagent to glycerol, generally gives the best results.

The condensation step is preferably conducted under conditions of ebullition of the reaction mixture, the temperature of the latter being permitted to rise, with the rising boiling point of the mixture, gradually to a maximum not exceeding 250° C., and of continuous removal of water from the reaction sphere.

The following examples will serve to illustrate how the invention may be carried into effect.

*Example 1*

Into an iron or copper reaction vessel having an efficient stirring device and furnished with a refluxing column and condenser, were charged 330 lbs. of high quality meta-para-cresol, 150 lbs. of glycerol and 25 lbs. of sodium acetate. The resulting reaction mixture, which as will be seen, contained a substantial excess of the phenolic reagent (cresol) over one molecular equivalent of the glycerol present, was then heated and the temperature gradually rose, with the boiling point of the mixture, until it reached approximately 250° C. The water of the reaction distilled off during the heating as ether formation proceeded, this removal of water from the reaction vessel being promoted by the presence of the excess of cresol, some of which (about 10–20 lbs.) distilled over during the reaction in azeotropic admixture with the water distilling off, acting in so doing as an entraining agent for the water. Towards the end of the reaction, after about 12 hours from the commencement thereof, when about 60% of the glycerol had been converted into cresyl glyceryl ethers, the reaction slowed down and the distillate was then mainly cresol. The batch in the reaction vessel was then cooled and 50 gallons of water were added to it, along with the 150 lbs. of xylene.

As the result of these additions, the cooling of the material and an efficient mixing thereof by stirring, the batch stratified subsequently into (a) a non-aqueous layer containing the cresyl glyceryl ethers that had formed in the reaction together with the unreacted cresol that had remained in the reaction vessel, dissolved in the xylene that had been added to the reaction product, and (b) an aqueous layer (formed by the water addition) containing unreacted glycerol, any polyglycerols that had been formed during the reaction and the sodium acetate that had been used as the catalyst. The aqueous layer (b) was then separated from the non-aqueous layer (a), after which its water content was removed by evaporation (distillation) to a degree sufficient to enable the resulting aqueous syrup, which contained the equivalent of about 60–70 lbs. of glycerol, the catalyst and about 20–30 lbs. of water, to be returned to the process for re-use therein, together with sufficient additional glycerol (80–90 lbs.) to make up the requisite total quantity thereof (150 lbs.), in the next batch of starting materials. The non-aqueous layer (a) containing the ethers and unreacted cresol was fractionally distilled to recover separately the xylene and unreacted cresol contents of the layer as early fractions of the distillation. The unreacted cresol thus recovered, together with unreacted cresol recovered from the distillate obtained during the heating of the reaction mixture, was also returned to the process for re-use in a succeeding batch. Re-distillation of the mixture of mono- and di-cresyl glyceryl ethers thus isolated was then effected, as is usually necessary or desirable, particularly from the point of view of removing the last traces of cresol therefrom, and the resulting yield of the mixed cresyl glyceryl ether product was found to be about 200 lbs. The mixed product was of the nature of a technical mono-ether as hereinbefore referred to, as will be apparent from the relative proportions, later stated, of the mono- and di-ether components of the mixture, being resolvable, by careful distillation, into a mono-cresyl glyceryl ether fraction (pure mono-ether) representing about 70% of the mixture (by weight) and a di-cresyl glyceryl ether fraction representing about 30% of the mixture.

It will be observed, by calculations based on the stated yield of about 200 lbs. of the mixed cresyl ethers from 150 lbs. of glycerol, that approximately 60% of the glycerol was converted into the mixed mono- and di-cresyl glyceryl ethers, approximately 47% representing conversion of the glycerol into mono-cresyl glyceryl ethers and the balance (13%) representing conversion of the glycerol into di-cresyl glyceryl ethers.

It will also be seen that the amount of cresol charged into the reaction vessel represents a molecular excess of 88% over the amount of glycerol similarly charged and further that the amount of catalyst (anhydrous sodium acetate) charged was equivalent in parts by weight to one-sixth (16.6%) of the glycerol charged.

*Example 2*

In this example the same cyclic procedure is employed as in Example 1, but the conditions of the condensation step are different, as will be seen, resulting in the presence of a higher percentage proportion of mono-ethers in the mixture of reaction products as compared with that in Example 1. The example may, therefore, be regarded as illustrative of the preferred manner of carrying the invention into effect with the use of the cyclic procedure referred to.

In the example a smaller molecular excess of the phenolic reagent (cresol) was used than in Example 1, only 250 lbs. being used for the same weight of glycerol (150 lbs.), representing a molecular excess of the phenolic reagent of 42%. Also a shorter reaction time was employed for the condensation step, namely 8 hours, and the resulting ultimate temperature of the reaction bath was slightly less, namely 220° C.

After 8 hours, when rather over 60% (actually about 65%) of the glycerol had been converted into cresyl glyceryl ether product and about 10–20 lbs. of the cresol had distilled over as an entraining agent as in Example 1, the batch was cooled and treated with xylene and water additions as and for the purposes stated in the previous example.

The recovered mixed ether product thus obtained, which was of the nature of a commercially pure mono-ether as hereinbefore referred to, as will be apparent from the proportionate amounts, later stated, of the mono- and di-ether components of the mixture, after separation from the xylene and unreacted cresol, yielded on fractionation in vacuo, as separate products, 180 lbs. of mono-cresyl glyceryl ether (pure mono-ether) and 20 lbs. of di-cresyl glyceryl ether.

These figures show by calculation a conversion of the glycerol reagent to the extent of approximately 65%, of which percentage 4.5% only represents conversion of the glycerol into di-ethers, the balance of approximately 60% being conversion into mono-ethers.

It will be understood that to the syrupy glycerol lye returned to the process for cyclic re-use in a subsequent batch-forming operation was added more glycerol (namely about 100 lbs.) to make up to the original 150 lbs. of this reagent.

Example 3

The xylenol fraction from coal tar (boiling range 210–225° C.) was reacted with glycerol in the presence of sodium acetate as catalyst to produce xylenyl glyceryl ethers, the conditions of the condensation reaction being similar to those in the Examples 1 and 2, except that allowance was made, as regards relative proportions of the reagents, for the difference in molecular weight as between the cresol used in those examples and the xylenol mixture used in this example and, where necessary, xylene entrainant was used to remove the water of reaction and maintain the temperature within the defined limits. The resulting crude material was worked up as in Examples 1 and 2, with isolation of the xylenyl glyceryl ethers which had been produced, and the unconsumed reagents being returned to the process. The yield obtained was similar to the yields of cresyl glyceryl ethers obtained in Examples 1 and 2.

Example 4

1:3:5 xylenol was reacted with glycerol in the presence of sodium acetate as catalyst to produce 1:3:5 xylenyl glyceryl ethers, in the following manner:

92 parts of glycerol (1 mol.), 220 parts of 1:3:5 xylenol (1.8 mol.) and 18 parts of sodium acetate (.22 mol.) were charged to a reaction vessel fitted with a short column leading to a condenser and decanter. The mixture was heated and xylene entrainant added in such a manner that xylene and the water of reaction continuously distilled as an azeotrope to the condenser and decanter, and the temperature in the reaction vessel was maintained at 205–215° C. The water and xylene separated in the decanter, the xylene being returned to the system. After 10 hours the vessel was cooled and the crude material worked up as in Example 1, whereby 120 parts (.61 mol.) of mono-1:3:5 xylenyl glyceryl ether were produced, together with 27 parts (.09 mol.) of di-1:3:5 xylenyl glyceryl ether, the unconsumed reagents being returned to the process as before.

Attempts to repeat the results in this example without the use of an additional entrainant resulted in relatively small yields only.

Example 5

Para tertiary butyl phenol formed by condensation of iso butylene with phenol, was reacted with glycerol in the presence of sodium acetate as catalyst to produce para tertiary butyl phenyl glyceryl ethers, in the following manner:

92 parts of glycerol (1 mol.), 300 parts of para tertiary butyl phenol (2 mols.) and 18 parts of sodium acetate were charged to a reaction vessel and heated in the presence of xylene entrainant as in Example 4, except that the temperature in the reaction vessel was maintained at 215–225° C. After 8 hours the vessel was cooled and the crude material worked up as in the Examples 3 and 4, 126 parts (.56 mol.) of mono-para tertiary butyl phenyl glyceryl ether and 36 parts (.1 mol.) of a di-para tertiary butyl phenyl glyceryl ether were produced and the unconsumed reagents returned to the process.

Example 6

The phenolic coal tar fraction (high boiling tar acids) (boiling range 230–260° C.) was reacted with glycerol in the presence of sodium acetate as catalyst as in Example 3, allowance being made for the difference in molecular weight of the phenol homologue used as compared with that in Example 3. Similar yields of phenolic glyceryl ethers resulted.

Example 7

Para tertiary amyl phenol was reacted with glycerol in the presence of sodium acetate as catalyst to form para tertiary amyl phenyl glyceryl ethers, as in Example 4, allowance being made for the difference in molecular weight of the phenol homologue used as compared with that in Example 4. Similar yields of mono- and di-para tertiary amyl phenyl glyceryl ethers resulted.

As may be anticipated, the various operating conditions of the process are to a certain extent inter-related as regards the nature and yield of the reaction product obtained in the process. It may be stated, however, as a general pointer, that increase of the molecular excess used of the phenolic reagent in the process tends to increase the proportionate amount of di-ether formation in the reaction, other conditions being the same, and correspondingly to reduce the proportionate amount of mono-ether formation, while lessening, however, the formation of polyglycerols; that increase of either the temperature of the reaction or the duration thereof, other conditions being again the same, tends to lessen both the proportionate amount of mono-ether formation in the reaction and also the actual percentage conversion of the glycerol into mono-ether; and that from a practical point of view, it is generally less economical to use a greater molecular excess of the phenolic reagent than about 100%, since the use of such a greater excess involves the necessity to recover considerably more material in the post-condensation recovery steps of the process; while as to the temperature of the reaction, it is generally advisable to employ a temperature not substantially in excess of about 220° C., assuming the phenolic reagent used be cresol as in the Examples 1 and 2.

A further factor tending to influence the nature and percentage yield of the reaction product in the process is the proportionate amount of catalyst used therein. This may be illustrated with reference to a case where under conditions otherwise in accordance with those of Example 1, an amount of sodium acetate equivalent to twice the amount in said Example 1 was used. In this case, the total glycerol conversion for the same reaction period of 12 hours as in Example 1 into a mixture of mono- and di-ethers was substantially lower than the 60% in Example 1—tending to indicate that the use of an excessively large proportionate amount of catalyst is undesirable. In the case of an alkali metal acetate, for example sodium acetate, an amount equal to about one-sixth of the glycerol used, in parts by weight, is generally a preferred amount to employ.

The mono-phenolic glyceryl ethers of this invention, more particularly those derived, as regards the phenolic reagent, from cresol, are of value in the plastics industry partly on account of their plasticising properties and partly on account of their bi-functional character as regards hydroxyl groups.

Inherent in the improved process of the invention are the following effects and advantages:

Firstly, it is known that glycerol at high temperatures forms polyglycerols.

Furthermore, sodium acetate has shown itself to be an example of a catalytic agent which, at temperatures suitable for the production of mono-phenolic glyceryl ethers, actively promotes the conversion of glycerol into polyglycerols. It could be expected, therefore, that there would be a substantial amount of polyglycerol formation taking place in the condensation reaction for the formation of the desired mono-phenolic glyceryl ethers, such polyglycerol formation constituting a competing condensation proceeding concomitantly with the ether formation. I have now found, however, in accordance with this invention, that the presence of a molecular excess of the phenolic reagent in the initial or early stages of the condensation step has, unexpectedly, the effect of actively promoting the reactions resulting in the formation of mono-phenolic glyceryl ethers, with the result that polyglycerol formation is effectively checked or minimised. A perusal of the figures given in the example, with reference to the percentage conversion of glycerol therein and the percentage yields of mono-phenolic glyceryl ether obtained in the complete process, will show this to be the case.

Secondly, it is necessary, for the condensation reaction to proceed continuously for the desired duration, that the water formed as the result of the reaction shall be continuously removed as the reaction proceeds. The presence of the molecular excess of the phenolic reagent in accordance with this invention facilitates such removal as already remarked, a small proportion of the excess distilling off continuously during the process and in doing so entraining the water with it, for example in the form of an azeotropic mixture.

Thirdly, the requisite amount of alkali metal catalyst salt (e. g. sodium acetate) in the process is relatively small, as is illustrated in the examples, as compared with the known Zickovic procedure referred to above. This is advantageous in that it tends to facilitate the desired course of the condensation reaction for high yields of the desired mono-ether products and also facilitates the solvent procedure in the complete process which as described follows the condensation step.

Fourthly, the procedure just referred to, as regards the eventual isolation of the ethers and the recovery for re-use in the process of the unconsumed reagents and the catalyst, is exceedingly simple and effective, thus rendering the process as a whole highly economical when operated on a commercial scale. In this connection, it may be remarked that the presence of a substantial proportion of unconsumed phenolic reagent in the mixture of reaction products which is obtained as the result of the hereinbefore described condensation step, assists the solvent action of the xylene or other hydrocarbon solvent used, in forming, in co-operation with the water addition to the mass, a highly complete and effective separation, suitable for use on a commercial scale, of the phenolic glyceryl ethers and unconsumed phenolic reagent on the one hand and unconsumed glycerol, catalyst and any polyglycerols present on the other.

Thus, whereas the mono-phenolic glyceryl ethers of the reaction product are partly soluble in water, while being freely soluble and miscible in the phenolic reagent employed, the presence of the unconsumed phenolic reagent serves to assist the xylene or other hydrocarbon solvent added, to form, co-operatively, a solvent medium which effects the complete and efficient solution of the ethers therein in the presence of the water addition. In consequence, a highly effective solution and recovery of the phenolic glyceryl ethers in the resulting non-aqueous layer is obtained, the resulting aqueous layer containing the unconsumed glycerol, the catalyst and any polyglycerols present, all of which are readily soluble in the water addition. The proportions of the xylene and water additions indicated in the examples are in the main illustrative of suitable proportions. The correct proportions in any given case are, however, governed by the need for an effective solvent action as regards each of the solvents. It may be also remarked that the presence of a substantial proportion of unconsumed phenolic reagent in the mixture of reaction products enables a non-aromatic hydrocarbon solvent to be used, if desired, and further, that if in the case of the hydrocarbon solvent, too litle be used, difficulties may be experienced in the subsequent distillation of the non-aqueous layer.

Fifthly, the unconsumed reactants and the catalyst thus made recoverable can conveniently be re-used in the process of co-ordinated cyclic procedure described and with a high measure of completeness. In consequence, high average yields of the ethers obtained over an extended period of operation of the process with re-cycling and re-use therein of the unconsumed reactants and the catalyst, are possible. For example, it has been found in practising the process under the conditions of Example 1, that yields as mixed ethers are obtained over an extended period corresponding to about 90 and 84% based respectively on the cresol and glycerol employed, recovered and re-cycled. Thus, in a series of batches employing said conditions of Example 1 it was consistently found that about 1000 lbs. of the mixed ether product (i. e. 700 lbs. of mono-cresyl glyceryl ether and 300 lbs. of di-cresyl glyceryl ether) required for its manufacture about 730 lbs. of cresol and 537 lbs. of glycerol. Similarly, when operating on a cyclic basis under the conditions of Example 2 over a series of batch-forming operations, an average yield of the mixed ethers was of the order of 90% of the theoretical yield, based on the cresol and glycerol reagents.

The ether forming reaction may, if desired, be effected under conditions of super-atmospheric pressure.

This is a continuation-in-part of my copending application Serial No. 611,266, filed August 17, 1945, now abandoned.

What I claim as my invention and desire to secure by Letters Patent of the United States is:

1. Process for the production of mono-cresyl glyceryl ethers by the condensation of a mixture of cresol isomers with glycerol in the presence of a catalyst which is a water-soluble alkali metal salt of a lower saturated fatty acid, characterised by the relative molecular proportions of the reagents as charged into the reaction vessel being from 1.4:1 to 2:1, cresol isomers to glycerol, and by the ensuing condensation reaction being effected with the removal of water along with cresol vapour during a rise in the temperature of the mass produced by applied heat to a temperature which does not exceed substantially 250° C., the condensation being concluded while the resulting product of mixed phenolic glyceryl ethers contains the mono-ether in preponderating proportion, in parts by weight, relative to the di-ether.

2. Process for the production of mono-phenolic glyceryl ethers, which comprises heating, in the presence of an alkali metal acetate as condensation catalyst, glycerol in admixture with a phenolic reagent comprising a monohydric phenol, the glycerol and phenolic reagent being used in relative molecular proportions of 1.4:1 to 2:1, phenolic reagent to glycerol, concluding the ensuing condensation reaction while the resulting product of phenolic glyceryl ethers contains the mono-ether in preponderating proportion, in part by weight, relative to the di-ether, and thereafter causing the reaction product mixture to be resolved into two separable layers composed respectively of solutions of (a) the phenolic glyceryl ethers and unconsumed phenolic reagent and (b) unconsumed glycerol and catalyst, separating the layers and recovering mono-ethers from the layer a.

3. Process as claimed in claim 2, wherein the condensation is conducted under conditions of ebullition of the reaction mixture—the temperature of the latter being permitted to rise, with the rising boiling point of the mixture, gradually to a maximum not exceeding 250° C., and of removal of water from the reaction sphere by a small proportion of the phenolic reagent serving as an entraining agent.

4. Process as claimed in claim 2, wherein the condensation is continued until at least a proportion in excess of 40% of the glycerol is converted into mono-ether and the condensation is concluded while the resulting mixture of mono- and di-ethers contains not more than 30% of the di-ether, in parts by weight.

5. Process as claimed in claim 2, wherein the resolution of the reaction product mixture into the two layers a and b is effected by adding a hydrocarbon solvent and water to the mixture, agitating the mass and then allowing the mass to settle and stratify.

6. Process as claimed in claim 2, according to which, after separation of the layers specified in said claim, the layer b is concentrated to a syrupy consistency and in this form is directly recycled to the process for re-use therein of the unconsumed glycerol and the catalyst contained in the solution.

7. Process as claimed in claim 2, wherein the resolution of the reaction product mixture and the two layers a and b is effected by adding a hydrocarbon solvent and water to the mixture, agitating the mass and then allowing the mass to settle and stratify and, after separation of the layers specified in said claim, the layer b is concentrated to a syrupy consistency and in this form is directly recycled to the process, for re-use therein of unconsumed glycerol and the catalyst contained in the solution, and the layer a is submitted to distillation to recover the solvent and unconsumed phenolic reagent, thus separating these materials from the ethers, which solvent and unconsumed phenolic reagent are recycled to the process for re-use therein.

8. Process as claimed in claim 2, according to which unconsumed reagents and catalyst recovered from the solutions a and b are recycled to the process for re-use therein.

9. Process for the production of mono-phenolic glyceryl ethers, comprising the step of effecting the condensation of glycerol with a phenolic reagent comprising a monohydric phenol relatively molecular proportions of 1.4:1 to 2:1, phenolic reagent to glycerol, under conditions involving the presence of an alkali metal acetate in the liquid reaction mixture, the removal of water by phenolic reagent vapour and continued presence in said liquid mixture, for at least the greater part of the duration of the condensation reaction, of unconsumed phenolic reagent in higher molecular proportion than unconsumed glycerol, the condensation being concluded while the resulting product of mixed phenolic glyceryl ethers contains the mono-ether in preponderating proportion, in parts by weight, relative to the di-ether, and in the presence also of unconsumed phenolic reagent and unconsumed glycerol.

10. Process as claimed in claim 1, wherein the condensation is effected in the presence of alkali metal acetate in the liquid reaction mixture.

11. Process for the production of mono-cresyl glyceryl ether by a direct condensation involving formation and removal of water of reaction, in the presence of a catalyst, said process comprising the steps of heating a mixture consisting initially of approximately 13 parts of meta-para cresol, 6 parts of glycerol and 1 part of sodium acetate (the stated parts being by weight), under conditions of ebullition of the mixture, the latter being permitted to rise, with the rising boiling point of the mixture, gradually, through a reaction period of about 12 hours, to a maximum of approximately 250° C., said heating being conducted under refluxing conditions permitting the removal of water of reaction by a small proportion of unconsumed cresol acting as an entraining agent; cooling the resulting mixture of mono- and di-ethers, unconsumed glycerol, unconsumed cresol and catalyst; and treating the cooled mixture for the isolation of the ethers and the recovery of the unconsumed reagents and catalyst.

12. Process for the production of mono-cresyl glyceryl ether by a direct condensation involving formation and removal of water of reaction, in the presence of a catalyst, said process comprising the steps of heating a mixture consisting initially of approximately 10 parts of meta-para cresol, 6 parts of glycerol and 1 part of sodium acetate (the stated parts being by weight), under conditions of ebullition of the mixture, the latter being permitted to rise, with the rising boiling point of the mixture, gradually, through a reaction period of about 8 hours, to a maximum of approximately 220° C., said heating being conducted under refluxing conditions permitting the removal of water of reaction by a small proportion of unconsumed cresol acting as an entraining agent; cooling the resulting mixture of mono- and di-ethers, unconsumed glycerol, unconsumed cresol and catalyst; and treating the cooled mixture for the isolation of the ethers and the recovery of the unconsumed reagents and catalyst.

13. Process for the production of mono-cresyl glyceryl ether by a direct condensation involving formation and removal of water of reaction, in the presence of a catalyst, said process comprising the steps of (A) heating a mixture consisting initially of approximately 13 parts of meta-para cresol, 6 parts of glycerol and 1 part of sodium acetate, under conditions of ebullition of the mixture, the latter being permitted to rise, with the rising boiling point of the mixture, gradually, through a reaction period of about 12 hours, to a maximum of approximately 250° C., said heating being conducted under refluxing conditions permitting the removal of water of reaction by a small proportion of unconsumed cresol acting as an entraining agent; (B) cooling the resulting mixture of mono- and di-ethers, unconsumed glycerol, unconsumed cresol and catalyst; (C) adding to the cooled mixture, while stirring, 2 parts of water and 6 parts of xylene; (D) allowing the resulting mixture to settle and stratify into two layers containing respectively (a) the mono- and di-ethers and the unconsumed cresol and (b) the unconsumed glycerol, the catalyst and polyglycerols that had formed in the condensation reaction; (E) separating the layers; (F) evaporating the layer containing the constituents (b) to a syrupy consistency; (G) fractionally distilling the layer containing the constituents a to recover the xylene and unconsumed cresol, separating them thus from the ethers; and (H) recycling to the process, for re-use therein of the unconsumed reagents, xylene and catalyst, (1) the syrupy liquor obtained by step F, and (2) the xylene and unconsumed cresol recovered by step G.

14. Process for the production of mono-cresyl glyceryl ether by a direct condensation involving formation and removal of water of reaction, in the presence of a catalyst, said process comprising the steps of (A) heating a mixture consisting initially of approximately 10 parts of meta-para cresol, 6 parts of glycerol and 1 part of sodium acetate, under conditions of ebullition of the mixture, the latter being permitted to rise, with the rising boiling point of the mixture, gradually, through a reaction period of about 8 hours, to a maximum of approximately 220° C., said heating being conducted under refluxing conditions permitting the removal of water of reaction by a small proportion of unconsumed cresol acting as an entraining agent; (B) cooling the resulting mixture of mono- and di-ethers, unconsumed glycerol, unconsumed cresol and catalyst; (C) adding to the cooled mixture, while stirring, 2 parts of water and 6 parts of xylene; (D) allowing the resulting mixture to settle and stratify into two layers containing respectively (a) the mono- and di-ethers and the unconsumed cresol and (b) the unconsumed glycerol, the catalyst and polyglycerols that had formed in the condensation reaction; (E) separating the layers; (F) evaporating the layer containing the constituents b to a syrupy consistency; (F) fractionally distilling the layer containing the constituents a to recover the xylene and unconsumed cresol, separating them thus from the ethers; and (H) recycling to the process, for re-use therein of the unconsumed reagents, xylene and catalyst, (1) the syrupy liquor obtained by step F, and (2) the xylene and unconsumed cresol recovered by step G.

15. In the process for the production of monophenolic glyceryl ethers by condensation of glycerol with a phenolic reagent comprising a monohydric phenol in the presence of a catalyst which is a water-soluble alkali metal salt of a lower saturated fatty acid, the improvement which comprises use of relative molecular proportions of said phenolic reagent to said glycerol of from 1.4:1 to 2:1, said condensation reaction being concluded while the resulting product of mixed mono- and di-phenolic glyceryl ethers contains the mono-ethers in preponderating proportion, in parts by weight, relative to the di-ether.

16. Process as specified in claim 15 wherein the phenolic reagent comprises a xylenol.

17. Process as specified in claim 15 wherein the phenolic reagent comprises a cresol.

MICHAEL FRANCIS CARROLL.

REFERENCES CITED

The following references are of record in the file of this patent:

UNITED STATES PATENTS

| Number | Name | Date |
| --- | --- | --- |
| 1,193,951 | Laszloffy | Aug. 8, 1916 |
| 2,303,582 | Russell et al. | Dec. 1, 1942 |
| 2,316,719 | Russell | Apr. 13, 1943 |

OTHER REFERENCES

Zivkovic Monatschefte fur chemie 29, 952-8 (1908).